April 22, 1952  D. R. VAIL ET AL  2,594,252
CELL CASE MACHINE

Filed Feb. 15, 1946  6 Sheets-Sheet 1

INVENTORS
DANIEL R. VAIL.
ROBERT A. DE LUCA
By Emery, Booth, Townsend, Midler Weidner
ATTORNEYS

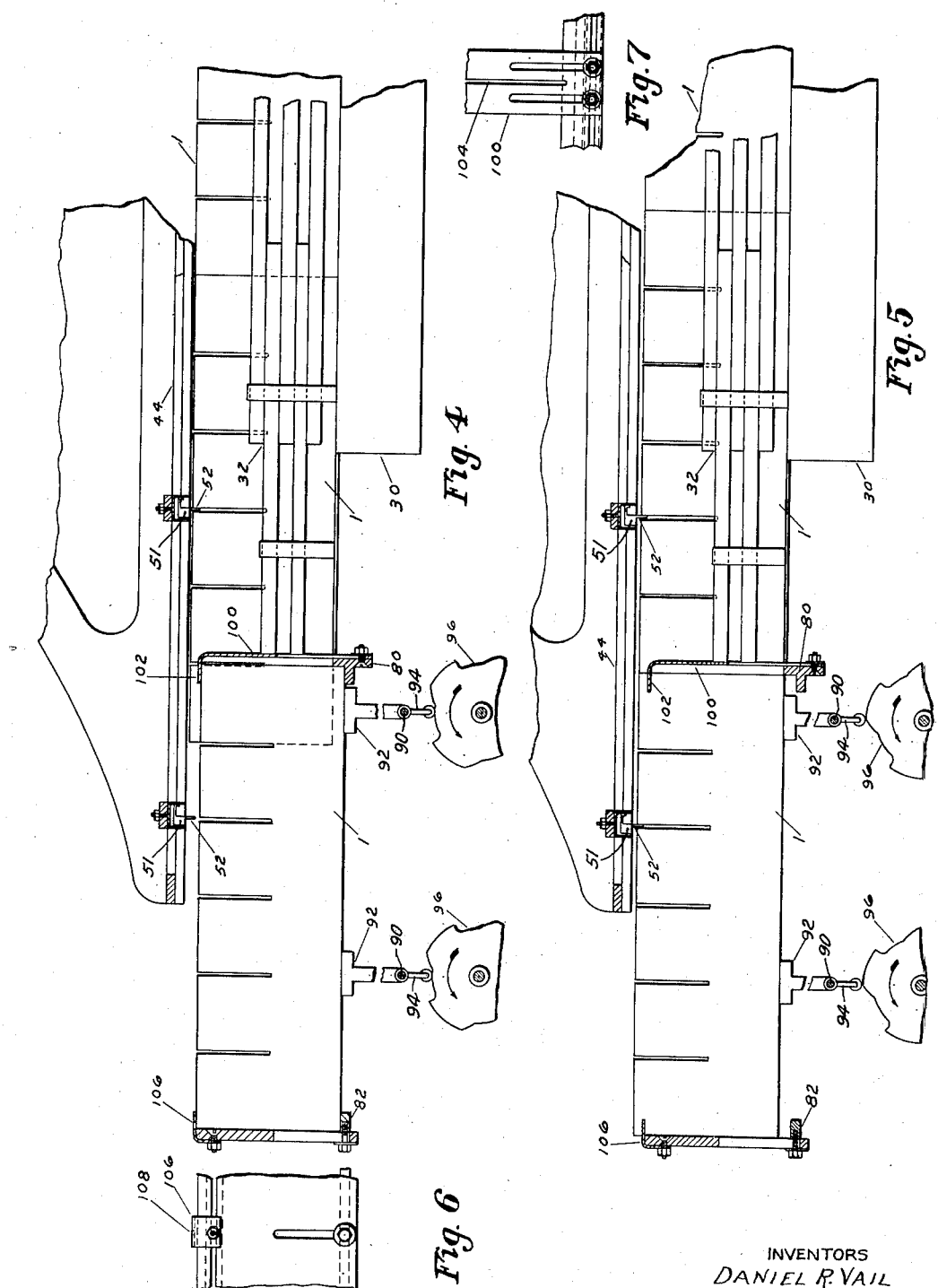

April 22, 1952 D. R. VAIL ET AL 2,594,252
CELL CASE MACHINE
Filed Feb. 15, 1946 6 Sheets-Sheet 4
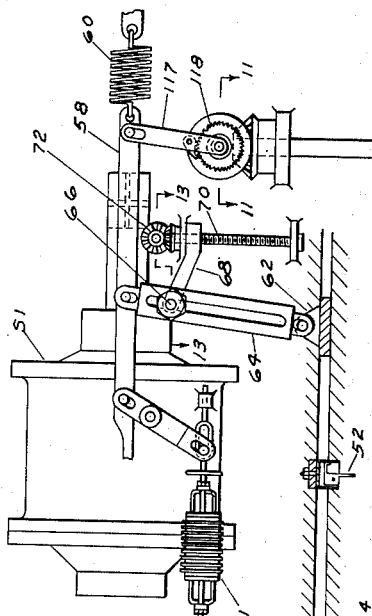
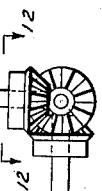
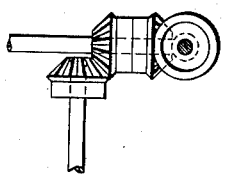
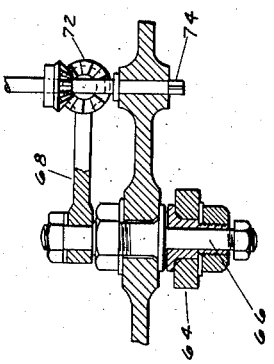
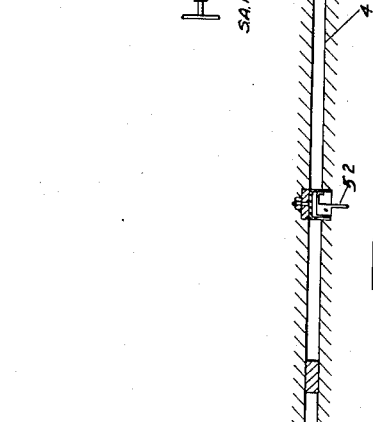
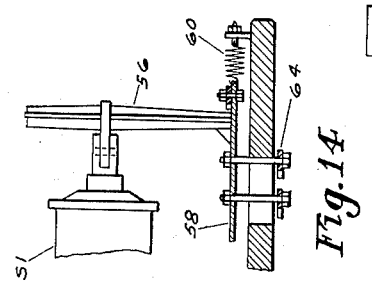
INVENTORS
DANIEL R. VAIL
ROBERT A. DELUCA
BY *Emery, Booth, Townsend, Miller & Weidner* ATTORNEYS April 22, 1952
D. R. VAIL ET AL
2,594,252
CELL CASE MACHINE
Filed Feb. 15, 1946
6 Sheets-Sheet 5
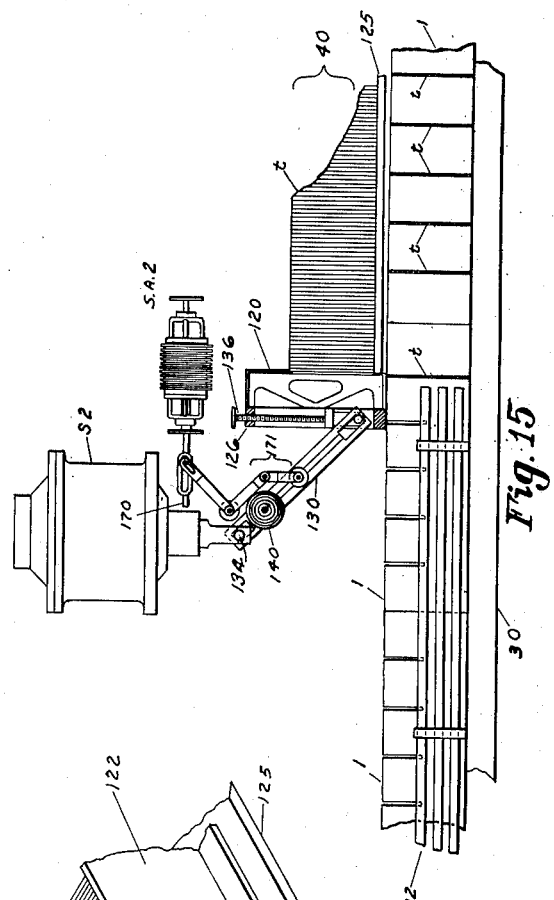
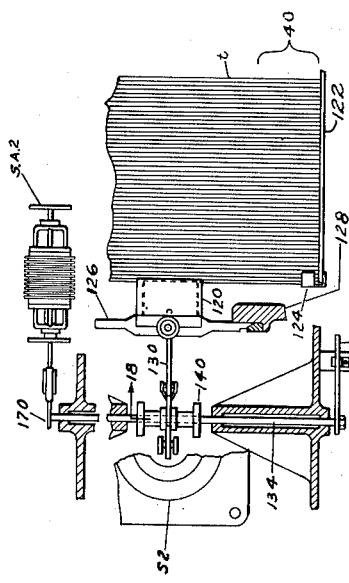
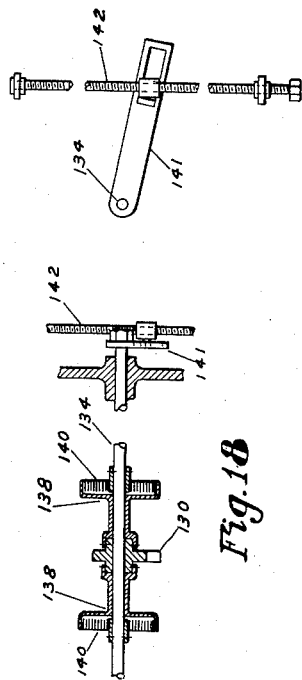
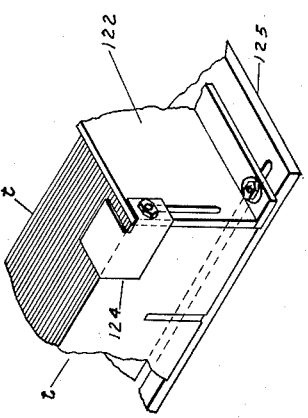
INVENTORS
DANIEL R. VAIL.
ROBERT A. DeLUCA.
By Emery, Booth, Townsend, Miller & Weidner ATTORNEYS Patented Apr. 22, 1952

2,594,252

UNITED STATES PATENT OFFICE 2,594,252

CELL CASE MACHINE

Daniel R. Vail, Brookline, and Robert A. De Luca, Boston, Mass., assignors to Henry C. Tuttle, Boston, Mass., as trustee Application February 15, 1946, Serial No. 647,747

16 Claims. (Cl. 93—37)

This invention relates to cell case machines and the object is to provide an improved machine for assembling in lattice form slotted partition strips to form an inset for a container which will divide it into compartments for reception of individual bottles, etc. Such inserts or cells characteristically consist of a number of parallel strips slotted part-way through from one edge which are interlocked in a halving joint with relatively perpendicular strips slotted from the opposite edge. It will be convenient to term one set of strips "longitudinals" and the others "transversals," although the distinction is arbitrary. While not limited thereto, the machine is particularly adapted to handle preformed partition strips cut from relatively rigid and thick material, such as faced corrugated board. Such strips have hitherto usually been assembled by a hand operation.

Our invention will be well understood by reference to the following description of the illustrative embodiment thereof shown by way of example in the accompanying drawings, wherein:

Figs. 4 and 5 are longitudinal sections through the magazine and the adjacent parts of the assembly table illustrating different positions of the parts during the operation of the machine;

Fig. 6 is a fragmentary end elevation of Fig. 4 as seen from the left in that figure;

Fig. 7 is a fragmentary end elevation of a portion of the magazine as seen from the right in Fig. 4 at about the middle of that figure;

Fig. 10 is a diagrammatic view showing the driving arrangements for mechanisms which select the longitudinals from the supply and advance them to the point of assembly;

Figs. 11, 12 and 13 are sections on the correspondingly numbered lines of Fig. 10;

Fig. 14 is a plan on a smaller scale of a portion of the mechanism which appears at the upper right-hand portion of Fig. 10;

Fig. 15 is a partial longitudinal section showing the mechanism for handling the transversals and assembling them with the longitudinals;

Fig. 16 is a partial plan view of the same with parts broken away;

Fig. 17 is an isometric view of the magazine for the transversals as viewed from the left in Figs. 15 and 16;

Fig. 18 is a section on an enlarged scale on the line 18—18 of Fig. 16 with parts broken away;

Fig. 19 is a fragmentary side elevation as viewed from the right of Fig. 18.

Figure 1:
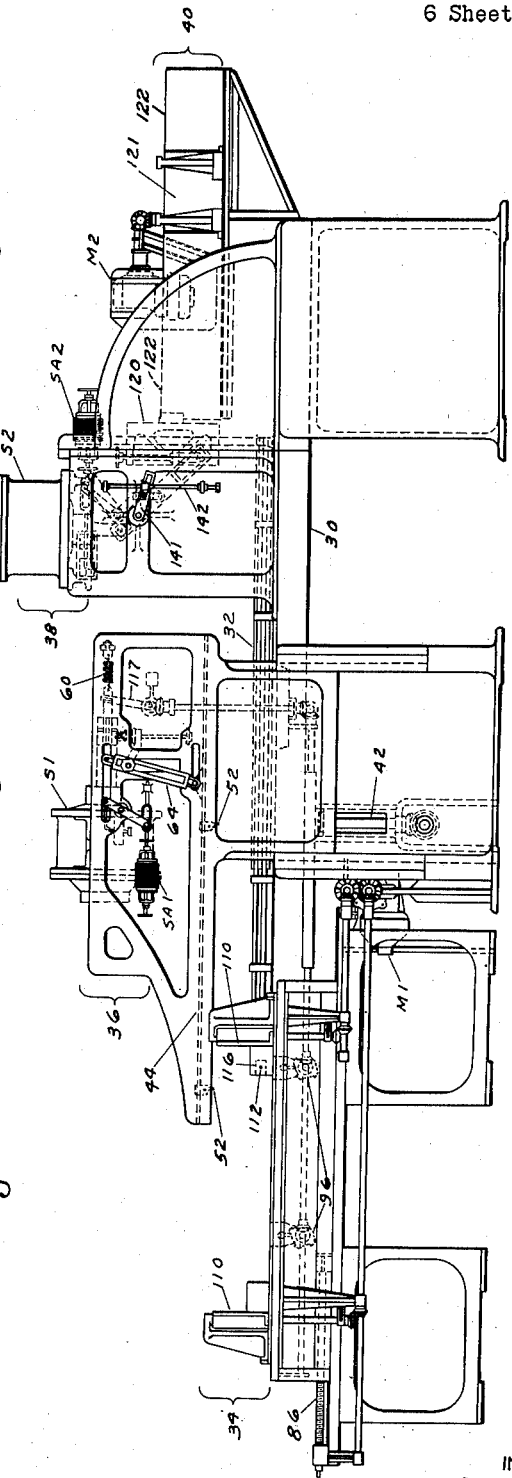
Fig. 1 is a side elevation of the complete machine and on account of its necessarily small scale is presented here chiefly as a frame of reference to show the relation of parts illustrated in the other figures. The machine is shown empty.

It will probably facilitate understanding of the machine first to outline in a very general way the various cooperating mechanisms thereof and their relation one with another, referring more particularly to Fig. 1. The machine shown embodies a table 30 over which a rank of longitudinals $l$ are advanced to a point where transversals $t$ are assembled therewith. The word "rank" is used as in the phrase "rank and file" and denotes a series of longitudinals in parallel side by side relation in the spacing which they occupy in the completed cell case. The longitudinals move over the table along guideways provided by upstanding walls 32 (see also Figs. 4 and 5) which may be compared to a pair of closely opposed rail fences which maintain the strips vertical with their slots pointing upwardly and in their proper spaced relation while offering little or no impediment to their forward movement. Provision may be made for adjusting the spacing of these guideways but it has been considered unnecessary to illustrate this in detail. The strips are advanced step by step over the table, the length of the steps corresponding to the spacing of the slots therein.

Additional ranks of strips are drawn from a magazine 34, as seen at the left in Fig. 1, wherein the strips are stored in a transversely extending stack or column and from which strips in the planes of guideways 32 and having the desired spacing to form a rank are moved from the left of the figure onto the surface of the table. The mechanism for extracting the strips and for advancing them over the surface of the table may be a unitary one supported on the overhanging frame 36.

At the right of the table the sub-frame 38 supports a mechanism which takes transverse strips from a magazine 40, wherein they are stored with their slots presented downward, and inserts them in the upwardly presented aligned slots of the longitudinals in the positions of rest between the step by step advancing movements of the latter. Provision is also made, as will appear, for intermitting the action of this mechanism when the joints between successive longitudinals, which, as already stated, are traversing the table in end to end abutting relation, pass the assembly point.

The machine illustrated is adapted to form a case comprising a rank of three longitudinals each with five slots in which are inserted five transversals. Adjustments are provided for handling cases of various sizes, as will be mentioned from time to time in the description or will be apparent from the drawings themselves. We have not considered it necessary verbally to describe the adjustments in detail.

Figure 8:
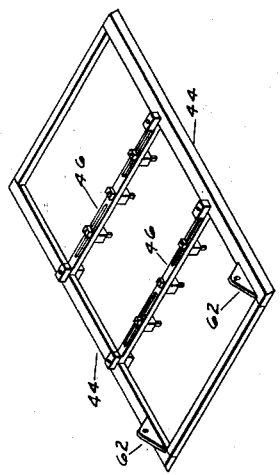
Fig. 8 is an isometric view on a smaller scale of a pawl-carrying carriage. In relation to Fig. 1 the carriage is shown as if it were removed from its position in Fig. 1 and swung substantially 180° in its plane, the nearer or left-hand end of the frame in Fig. 8 being the right-hand end in Fig. 1.
Figure 9:
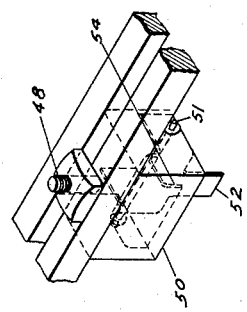
Fig. 9 is an enlarged view of one of the pawls and its housing.

Referring now more particularly to Figs. 1, 8, 9 and 10, we will now describe the mechanism which advances the strips over the table and those parts unitary therewith which constitute a part of the mechanism for extracting a rank of longitudinals from the column thereof stored in the magazine 34. As already stated, this mechanism is organized on an overhanging frame 36 opposing the table and which may be vertically adjusted to accommodate strips of different heights as by means of the hoisting device 42 unnecessary to illustrate in detail. The sides of the frame 36 provide guideways in which slide the side members of a pawl-carrying frame 44 shown detached in Fig. 8. These side members are bridged by transverse bars 46 on which are mounted by means of the threaded stems 48 (see Fig. 9) boxes 50 traversed by pivot pins 51 on which are pivoted pawls or feed fingers having depending noses 52 and shoulders 54 which are adapted to make contact with the walls of the boxes so that, viewing Figs. 4 and 5, the portions 52 may not swing clockwise beyond the vertical positions therein illustrated so that when they enter the slots in longitudinals l they will, when the frame moves toward the right in Figs. 4 and 5, feed the longitudinals. On the other hand, when the frame moves toward the left, the pawls may rock and slide over the top edges of the longitudinal strips. The pawls which are seen at the right in Figs. 1, 4 and 5 may be said to oppose the table 30 and their principal function is to feed therealong strips supported on the top of the table, whereas the pawls shown at the left are considerably on the intake side of the table, oppose the magazine 34 and serve to separate strips from the column in the magazine and transfer them therefrom to the table as will more fully be described hereinafter. As seen in Figs. 8 and 9, the stems 48 of the laterally disposed boxes are received in slots in bars 46, thus providing for adjustment of the lateral spacing of the pawls to correspond to the desired spacing of the longitudinals of the cell case.

The stroke of the pawls is equivalent to the spacing of the slots in the longitudinals and comprises a power stroke toward the right in Fig. 1 which feeds the longitudinals and a spring-operated return to initial position. The power stroke (see Figs. 10 and 14) is effected by the energization of a power solenoid S1, the core of which, as seen in Fig. 14, is connected to a crosshead 56 by which is carried for reciprocation longitudinally of the machine bars 58 which are returned by means of springs 60 when the solenoid is deenergized. It will be understood that the construction just described and shown in Figs. 10 and 14 is duplicated at the two sides of the machine. The bars 58 are connected to ears 62 on the pawl-carrying frame 44 by levers 64 pivoted at 66 so that the solenoid and the cooperating springs 60 effects reciprocation of the frame 44 and of the feed fingers or pawls carried thereby. The pivot 66 may be adjusted and is here shown as carried on an arm 68 which will be moved along a screw 70 when the latter is rotated through the bevel gearing 72, the shaft 74 of the vertical bevel gear shown in Fig. 2 (see Fig. 13) being rotatable by the application of a suitable tool at the exterior of the machine. A shock absorber SA1 may be connected to bar 58 to control the motion at the completion of the power stroke.

Figure 3:
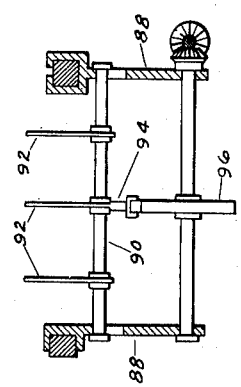
Fig. 3 is a partial section on the line 3—3 of Fig. 2.

There will next be described the construction of the magazine 34 for the longitudinals, which magazine is located at the left in Fig. 1 and reference will be made more particularly to Fig. 2. The magazine comprises two transversely extending angle members 80 and 82, the concavities of which face upwardly and toward one another (see Figs. 4 and 5), the forward member 80 being supported on the longitudinal frame members 84 which extend adjacent the sides of table 30 and the other member 82 being a portion of a unit which is slidably adjustable along these frame members 84 toward and from the frame 80 by means of the adjusting screw 86, thus providing for a variation of the longitudinal dimension of the magazine to accommodate different lengths of partition strips which are adapted, as seen in Figs. 4 and 5, to rest on the horizontal flanges of the members 80 and 82 and between the vertical flanges thereof, the supply of strips in the magazine forming a stack or column which extends transversely of the machine or from bottom to top of Fig. 2. As appears from Figs. 4 and 5, strips carried in the magazine will be supported at an elevation slightly below the top of table 30 and the left-hand pawls 52 of the feed frame will, while the strips are in this position, vibrate idly above the tops of the strips. At suitable intervals strips are raised into the path of the pawls to be engaged thereby and to be extracted from their position in the column or stack for transfer to the feed table. The exact sequence of operations will be more fully described hereinafter but the mechanism utilized may here be described with reference particularly to Figs. 3, 4 and 5. Slidably mounted for vertical movement in depending webs 88 below the magazine (Fig. 3) are transverse rods 90 which carry pusher fingers 92 adjustably mounted along the rods to correspond to the desired spacing of a rank of longitudinals. Depending arms 94 from these rods carry cam followers cooperating with cams 96. When the followers ride on the rises of the cams, as seen in Fig. 5, the pusher fingers 92 engage those strips in the column which overlie the same and raise them from the position of Fig. 4 to the position of Fig. 5 and in the latter position the upper edges of the strips are in the paths of the pawls 52 which vibrate above the magazine so that the pawls may enter the slots in the top edges of the longitudinals l, as shown in Fig. 4, and feed toward the right in Figs. 4 and 5 from between the other elements in the column and out of the magazine for transfer to the table 30 those strips the positions of which correspond to the spacing of the rank. When this transfer has been effected in the manner hereinafter described, the fingers 92 drop to the position of Fig. 4 and after the strip, such as that shown in the middle of Fig. 1, has made one more step toward the right in that figure, the column in the magazine is free to be closed up and another set or rank of longitudinals may be selected therefrom on the next cycle moving from the same absolute positions transversely of the machine as the previous rank or set.

Figure 2:
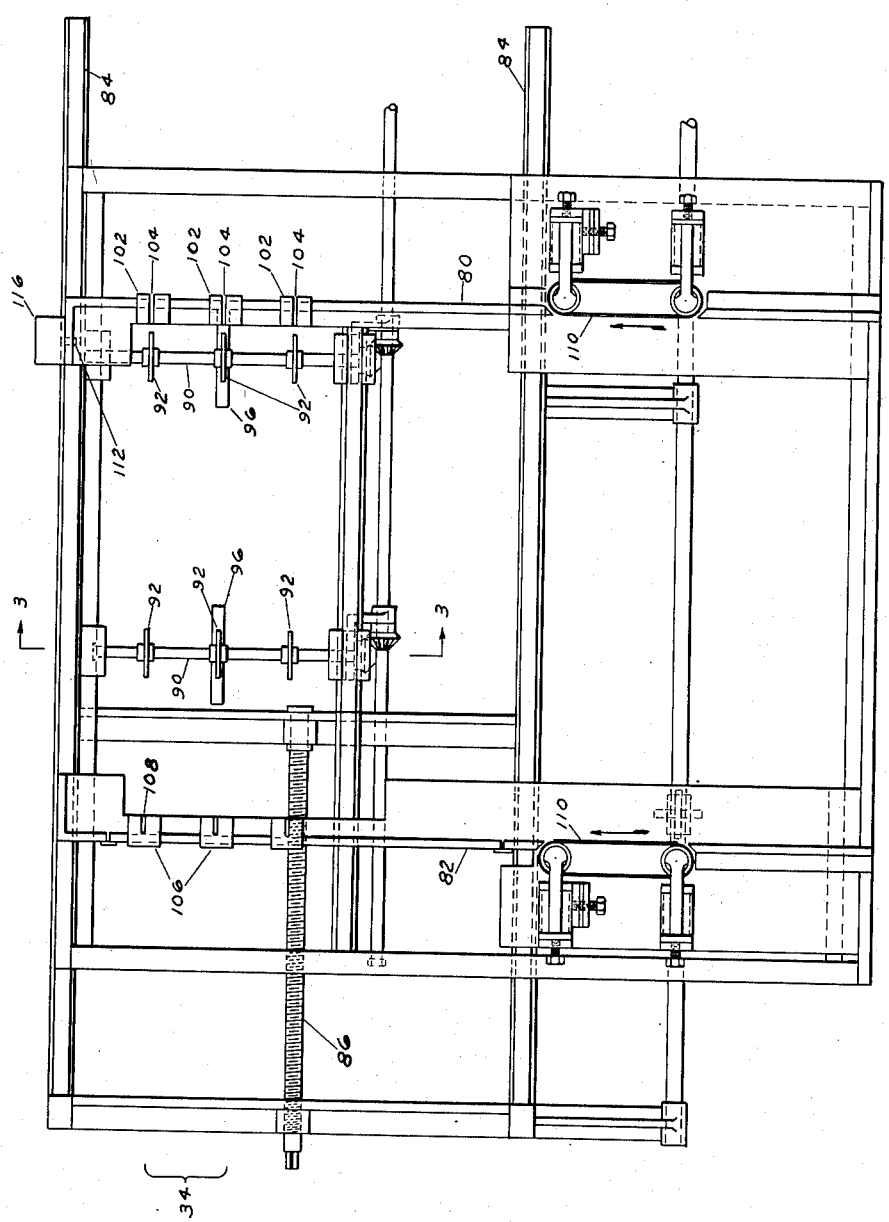
Fig. 2 is a plan view of the magazine for the longitudinals which appears in Fig. 1 toward the left of that figure.

To insure that only the desired strips properly spaced to form a rank are moved from the magazine there may be adjustably secured to the forward wall of the member 80 stops or guards 100 having upwardly extending portions and inturned portions 102 overlying the tops of the strips of the magazine, both portions being provided with a slot 104 which permits the right-hand end of the selected strip to be raised therethrough by operation of the fingers 92 and the strip to be fed forwardly, viewing Fig. 7, or to the right, viewing Figs. 2 and 4, out from the magazine and to the table 30 while adjacent strips which might tend to move therewith by friction are restrained by contact with the stops 100. On the rear member 82 there are adjustably mounted fingers 106 overhanging the rear corners of the strips (see Figs. 2 and 6) and having slots 108 which similarly selectively permit the vertical movement of the left-hand ends of the selected strips to be raised by the movement of the fingers 92.

To insure the closing up of the column along its altitude which extends transversely of the machine, there may be provided at the intake end of the magazine (lower side, Fig. 2) feed belts 110 which may be driven (see Fig. 1) from a rotary electric motor M' by means not necessary to describe in detail. One run of each belt extends through the vertical flange of the guides 80 and 82 and moves upwardly, viewing Fig. 2, making frictional contact with the end edges of the strips and maintaining them in a closely arranged column or stack in the magazine and causing the stack to close up when a set of longitudinals has been withdrawn from spaced positions therealong. To insure the effectiveness of this closing-up action there may be provided at the further end of the magazine and preferably at the forward corner a feeler 112 which is normally depressed by the pressure of the strips in the magazine, but when not pushed backwardly by the strips will be released as by means of a spring 114 (see Fig. 20) to open a control switch 116 or operate some similar mechanism which will interrupt the operation of the machine and permit the jam which may have occurred to be cleared. Thus, viewing Fig. 20, it is apparent that the switch 116 is in the main line on the positive side of the wiring system and the opening of the switch will cut off the supply of power to the machine.

The cams 96 (see Fig. 10) are driven in timed relation to the vibrations of the feeding frame 44 and are herein shown as taking their motion from the solenoid driven bar 58 which on the power stroke of the solenoid operates pawl lever 117 driving ratchet wheel 118 which through the bevel gearing fully illustrated in Figs. 10, 11 and 12 and unnecessary here to describe in detail intermittently turns the cams. In the arrangement shown the cams make one revolution for each four strips handled by the pawls 52 and therefore they have four lobes as shown. The pawls make six strokes for each strip and the fingers 92 are up for four of these strokes and down for two of them.

Referring now to Figs. 4 and 5, the manner in which successive ranks of longitudinals are withdrawn in their proper spaced relation from the solid column or stack in the magazine, transferred to the table 30 and advanced over the table to the assembly point in end-abutting relation, as seen in those figures and in Fig. 15, will now be described.

Referring to Fig. 5, let us consider the strip shown at the left, disregarding the others. The cams 96 have raised this strip $l$ through slot 108 and the horizontal portion of slot 104 (Fig. 2) so that its upper edge is in the path of the left-hand pawl 52 which enters the second slot therein, as shown in Fig. 5, wherein the pawl is in its extreme left-hand position. The solenoid is energized and the strip moves through the slot 104 (Fig. 7) to the right partly out of its position in the stack for a distance corresponding to the spacing of the slots. On the next stroke the left-hand pawl will engage the third slot in the card, and at the end of the third stroke the strip will have been so far advanced that its forward edge is supported on the table 30 and the pawl 52 at the right will engage the first slot. Although at this point both pawls have a feeding action, it might be said that the right-hand pawl has now taken over the feeding function. On the fifth stroke the left-hand pawl will engage behind the edge of the strip and the two pawls will move it to the position of the middle strip shown in Fig. 4. The fingers 92 then drop but the strip is supported by the table and by the forward wall 80 of the magazine in the path of the right-hand pawl which continues to feed it. On the next stroke succeeding Fig. 4 the strip now in the position of the middle one in that figure will be completely withdrawn from the magazine and permit the column of strips in the magazine to be closed up, urged thereto by the belts 110. During this time the left-hand pawl 52 is idling above the strips, but after the middle strip, viewing Fig. 4, has been withdrawn, on the completion of the power stroke following the position of Fig. 4 the cams will elevate the left-hand strip to the position of Fig. 5, permitting the left-hand pawls to enter the second slots therein and begin the extraction of another rank of strips which are advanced as seen in Fig. 5 in end-abutted relation with those of the previous rank.

After the flow of strips in end-abutted files or lines has been thus established, there will come a time when on the second stroke following the position of Fig. 5 the right-hand pawl will be presented at the joint between two successive strips of the file, as illustrated in that figure. It will not then swing counterclockwise to the vertical position shown but will remain with its nose portion resting on the top edges of the strips and the feed of the leading strip will be by the push of the following strip which will then be engaged by the left-hand pawl in the fourth slot of the strip.

Referring now to Fig. 15, the ranks of longitudinals $l$ are advanced step by step over the table 30 and at intervals of their forward movement come to rest with successive ranks of aligned slots at an assembly point underneath an inserting plunger or ram 120 which strips transversals one by one from a stock or supply thereof and drives the downwardly presented slots thereof into engaging relation with the upwardly presented slots of the longitudinals. The stack of transversals t is supported in the magazine 40 and may be advanced therein (toward the left in Figs. 1 and 15) by suitable means such as belts 121 similar to the belts 110 and driven by rotary electric motor M2 and which it is considered unnecessary here to illustrate in detail. The transversals t are stacked on edge between side walls 122 of the magazine (see Fig. 17) and advanced therein against stops 124 opposing the upper left-hand corners of the stack or column so that the leading or left-hand element of the stack is just beyond the edge of the bottom 125 of the magazine, the mutual pressure of the elements being sufficient to keep it from casually dropping from its place in the stack but leaving it free to be stripped therefrom by the plunger 120 and assembled with the longitudinals.

The plunger 120 is herein shown as a unit of box-like form opposing the middles of the transversals t and carried by a vertical slide 126, the edges of which are guided in upright frame elements 128 of sub-frame 38. The downward or inserting stroke of the slide and plunger is effected by energization of the solenoid S2 and the return is by a spring. The core of the solenoid is here shown connected to a lever 130 swinging on shaft 134 (Fig. 18), the other end of the lever being connected to the slide 126 herein with provision for adjustment by means of adjusting screw 136. The hub of lever 130 (see Fig. 18) carries the spool-like elements 138 which house torsion springs 140, one end of each spring being anchored to the hub and the other being connected to shaft 134. These springs rock lever 130 counterclockwise, viewing Fig. 15, when the solenoid is deenergized and return the plunger to elevated position. The tension of the springs may be adjusted by means of arm 141 secured on shaft 134 and positioned by adjusting screw 142 (Fig. 19). A shock absorber SA2 may be connected to link 130 by linkwork 171 to cushion the plunger as it completes its stroke.

The general timing of the operations of the machine may be described as follows. The solenoid S1 is energized, advancing the strips across the table and past the assembly point below the plunger 120 a distance equal to that between slots of the strips. The solenoid S2 is energized, causing a transversal to be inserted in the aligned slots of the longitudinals at the assembly point, the plunger 120 then retreats and another feed operation occurs. However, at those points when, instead of a rank of aligned slots, the abutting ends of two successive ranks of longitudinals are at the assembly point, means are provided for intermitting the operation of the plunger 120. That is, the solenoid S2 is not energized at this time. However, the regular periodical energization of solenoid S1 continues. Otherwise described, we might say that there is a regular series of operations for each cell case which begins and ends with a feed stroke effected by the power of the solenoid S1 and within which series the strokes of the pawl-carrying frame and of the plunger 120 under the actuation of solenoids S1 and S2 respectively alternate.

The method of effecting this general operation may be described in connection with the wiring diagram (Fig. 20), but before proceeding to describe the electric circuits, certain mechanical mechanisms there illustrated may be preliminarily referred to. Thus, referring to the left of the figure, there is there shown an extension of the bar 58 which is reciprocated by the solenoid S1 and by the return spring 60, which extension has two depending fingers 150 and 152. When the bar moves to the left in the figure, the finger 150 will strike finger 154 projecting upwardly from a sliding rod 156 which is normally drawn to the right by a spring 158 and the finger 160 on this rod will make contact with switch lever 162 to move it counterclockwise, viewing the figure. When the rod is moved to this position, a shoulder 164 thereon is moved past a shoulder on a spring 166 which snaps up behind shoulder 164 so that the rod is locked in this left-hand position. Spring 166 has a tail 168 extending into the path of projection 152 on rod 58 and when the spring 60 returns bar 58 to its extreme right-hand position, that is, when the pawl-carrying frame 43 has gone back on its idle stroke to its extreme left-hand position, the finger 152 pressing against the arm 168 of the spring from the left will flex the same, releasing the shoulder 164 and permitting spring 158 to retract rod 156 to the position illustrated.

Figure 20:
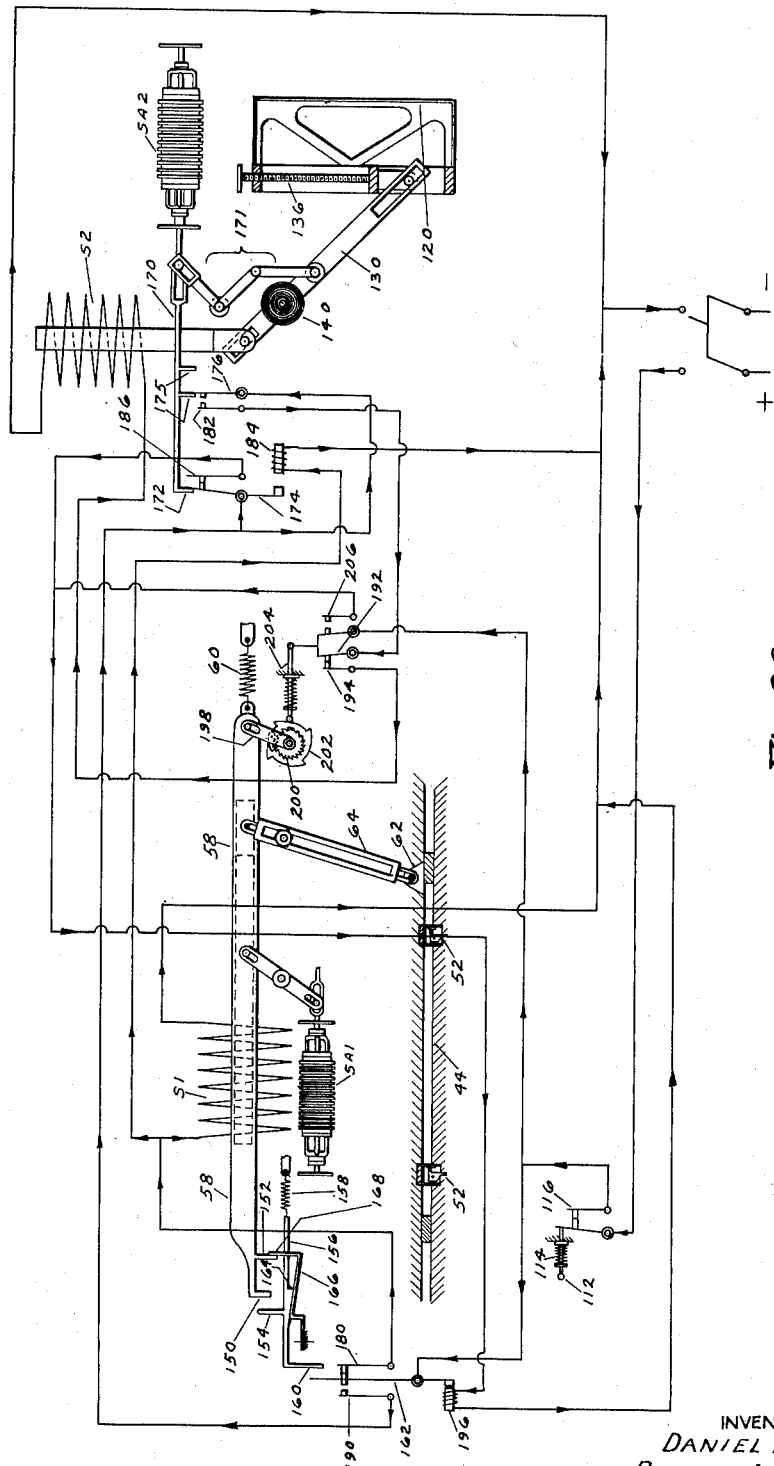
Fig. 20 is a wiring diagram.

Referring now to the right-hand side of Fig. 20, a rod 170 extends from the shock absorber SA2 and receives reciprocating motion coordinated with that of the plunger and of the core of solenoid S2 by the linkwork 171 connected to lever arm 130 by a lost motion connection as shown which is effective to move rod 170 quickly to the left as the plunger completes its up stroke. A finger 172 at the extreme end of this rod will, when the rod moves to the right, rock switch lever 174 clockwise while two spaced fingers 175 lying at opposite sides of switch lever 176 will rock it clockwise when the rod 170 moves to the right, that is, when the plunger 120 goes down, and will rock it counterclockwise when the rod moves to the left, that is, when the plunger has risen again under the action of the springs 140.

Considering now the wiring, the switch 116 has already been described, it being in the main line and controlling the supply of current to the entire system mentioned, and it need not herein be referred to although it forms a part of all the circuits which will be described. In tracing these circuits, they may conveniently be traced from the negative side of switch 116.

In Fig. 20 the position of the parts is that in which the plunger 120 is down, the solenoid S2 has been deenergized but the plunger has not yet been returned to elevated position by the springs 140 while the bar 58 controlling the feed frame 44 is just about to commence its stroke under power, the bar 58 moving to the left and the frame to the right. Solenoid S1 is energized through switch lever 162 cooperating with contact 180, the current going from the solenoid coil direct to the negative side of the line. During the power stroke of solenoid S1 springs 140 have raised the plunger 120 and moved rod 170 to the left from the position shown, releasing switch lever 174 and closing switch lever 176 on contact 182. In parallel with the solenoid coil S1 in a circuit traced through contact 180 is the coil of a switch-operating magnet 184 which when energized rocks switch lever 174 counterclockwise from the position illustrated in Fig. 20 if permitted to do so by the movement of finger 172 of rod 70. Therefore, when the plunger 120 has returned to its elevated position, the circuit will be closed at 176 and 182 by the action of the right-hand one of the two fingers 175 and switch lever 174 will have been released and separated from contact 186 by the energization of magnet 184.

On the completion of the power stroke of the solenoid S1 finger 160 moves lever 162 from contact 180, deenergizing the solenoid but closing lever 162 against contact 190 and thus closing a circuit for solenoid S2 as follows: through switch lever 162 and contact 190, switch lever 176 and contact 182 (which latter are in closed position by virtue of the upward movement of the plunger which has resulted in movement to the left of rod 170), switch 192 closing against contact 194, to the solenoid and thence to the negative side of the line. The energization of solenoid S2 forces ram 120 down, the corresponding movement of 170 to the right breaks the energizing circuit at 176—182, releasing the ram at the conclusion of its down stroke to be returned by springs 140. This movement of the rod also closes switch lever 174 against contact 186 which permits current to flow to magnet 196. Then, if the idle stroke of feed bar 58 under the influence of spring 60 has been completed causing the latch 166 to be released and finger 160 to move away from switch lever 162, the magnet 196 will rock switch lever 162 away from contact 190, closing it against 180 and beginning the cycle again by energizing solenoid S1. In this normal operation of the parts when slots of the longitudinals are presented at the assembly point, it will be noted that the circuit of solenoid S2 is through the switch lever 192 and contact 194. The reciprocating movements of bar 58 rock a pawl lever 198 cooperating with a ratchet wheel 200 to turn a cam 202 which moves against its spring a rod 204 to throw switch lever 192 to the right, breaking the circuit at 194 but closing it against contact 206, this occurring periodically at the times when the abutting ends of two strips are at the assembly point beneath the ram. The solenoid S2 is therefore not energized and no transversal is fed from the magazine at this point. However, the movement of switch lever 192 to contact 206 closes a circuit to the coil of magnet 196 so that the circuit of the solenoid S1 will be closed at 180 as before and the feed frame will make two successive strokes without any intervening stroke of the plunger 120.

If the plunger 120 returns to its starting position before the conclusion of the power stroke or feed stroke of bar 58, that is, before the pawls have completely advanced the next empty rank of slots in the longitudinals to the assembly point, it remains in that position until the circuit is closed at the point 190. If the feed bar 58 returns to its starting position before the plunger has completed its power stroke and completed the insertion of the transversals in the slots, it remains in that position until the closing of the circuit at 186 by the action of the finger 172 mechanically effective when the plunger reaches its lowest position. If the magnet 196 should be energized before bar 58 has returned to its starting position under the influence of the spring 60, it will not be effective to swing switch lever 162 which is latched out of position by the finger 160 until movement of the feed bar to the extreme right-hand position in Fig. 20 releases shoulder 164 and therefore frees switch lever 162 to be swung against contact 180 by magnet 196.

It will be seen that as each solenoid completes its power stroke it effects its own deenergization and also establishes certain electrical conditions necessary for the energization of the other solenoid which, however, does not occur until a mechanical release has been effected by the spring return of such other solenoid to its initial position.

It will be apparent that the invention may be embodied in other specific forms without departing from the spirit or essential attributes thereof, and the present embodiment should therefore be considered in all respects as illustrative and not restrictive, as is in fact clear in several matters form the description itself. Reference is to be had to the appended claims to indicate those principles of the invention exemplified by the particular embodiment described and which it is desired to secure by Letters Patent.

We claim:

1. Apparatus for assembling slotted partition strips comprising a step by step feeding device for advancing successive ranks of longitudinals in end-abutting relation by steps corresponding to the spacing of the slots past an assembly point, an inserting device at the assembly point for taking successive transversals from a supply and inserting them in ranked slots, and means for imparting feeding strokes and inserting strokes to said devices respectively alternating with retracting strokes to initial position and with said feeding and inserting strokes respectively in recurrent groups, each of which begins and ends with a feeding stroke and within which the inserting strokes alternate with the feeding strokes whereby the points of abutment of successive ranks are advanced past the assembly point while the inserting device is idle.

2. Apparatus for assembling slotted partition strips comprising a feed mechanism for advancing step by step ranks of longitudinals, power means energizable to move said mechanism through a single stroke and means for thereafter repositioning said feed mechanism, a mechanism for inserting transversals in aligned slots of a rank, power means energizable to move said inserting mechanism through a single stroke and means for thereafter repositioning the same, and means operated on the conclusion of the power stroke of each of the mechanisms respectively for energizing the power means of the other.

3. Apparatus for assembling slotted partition strips comprising a feed mechanism for advancing step by step ranks of longitudinals in uninterrupted succession, power means energizable to move said mechanism through a single stroke and means for thereafter repositioning said feed mechanism, a mechanism for inserting transversals in aligned slots of a rank, power means energizable to move said inserting mechanism through a single stroke, means for thereafter repositioning the same, means operated on the conclusion of the power stroke of each of the mechanisms respectively for energizing the power means of the other, and means responsive to a plurality of strokes of the feed mechanism for periodically intermitting the energization of the power means which operates the inserting mechanism.

4. Apparatus for asembling slotted partition strips comprising a reciprocating member having longitudinally spaced pawls for cooperating with the slots of longitudinals for advancing successive ranks thereof in end-abutted relation to an assembly point, a device at the assembly point for taking successive transversals from a supply and inserting them in ranked slots, an actuator effecting successive reciprocating strokes of the member, an actuator for effecting successive operation of said device out of phase with the strokes of the said member and a governing device intermitting at intervals the operation of said transversal inserting device whereby the points of contact of successive ranks are advanced past the inserting device without operation of the latter.

5. Apparatus for assembling slotted partition strips comprising a feed mechanism for advancing step by step ranks of longitudinals in uninterrupted succession, power means for actuating the same, a mechanism for inserting transversals in aligned slots of a rank, power means for actuating the same, and means responsive to a plurality of movements of said feed mechanism for periodically intermitting the actuation of the inserting mechanism.

6. Apparatus for assembling slotted partition strips comprising a reciprocating member having pawls for advancing step by step ranks of longitudinals in unbroken succession by cooperation of the pawls with the slots thereof, a solenoid for operating the member in one direction and a return spring, a ram for driving transversals into aligned slots of a rank, a solenoid for operating the ram in one direction and a return spring, the circuit of each solenoid comprising a switch which is opened as the member actuated by the solenoid completes its stroke under the power of the solenoid, and a switch which is closed responsively to the completion of the power stroke of the other solenoid.

7. Apparatus for assembling slotted partition strips comprising a reciprocating member having pawls for advancing step by step ranks of longitudinals in unbroken succession by cooperation of the pawls with the slots thereof, a solenoid for operating the member in one direction and a return spring, a ram for driving transversals into aligned slots of a rank, a solenoid for operating the ram in one direction and a return spring, and a wiring system including a circuit for each solenoid comprising a switch which is opened as the member actuated by the solenoid completes its stroke under the power of the solenoid, and a switch which is closed responsively to the completion of the power stroke of the other solenoid, the wiring system including also a switch having two contacts from the first of which it is shifted to the second on periodically recurring actuations of the reciprocating member and from which second contact it is returned to the first when said periodically recurring actuations have been completed, the removal of the switch from the first contact being effective to deenergize the circuit of the ram-operating solenoid and the engagement of the switch with the second contact being effective to cause energization of the operating circuit of the other solenoid whereby the points of contact of successive ranks are advanced past the ram without operation of the ram on a transversal.

8. Apparatus for assembling slotted partition strips comprising a feed mechanism for advancing step by step ranks of longitudinals past an assembly point, a reciprocating mechanism for inserting transversals in aligned slots at said point, solenoids for imparting power strokes to said mechanisms respectively, means for returning them to initial position, means operated at the conclusion of the power stroke of each solenoid for deenergizing that solenoid, and cooperating means controlled respectively by the conclusion of the power stroke of each solenoid and by the completion of the return stroke of the other solenoid for energizing said other solenoid.

9. Apparatus for assembling slotted partition strips comprising a feed mechanism for advancing step by step ranks of longitudinals, power means energizable to move said mechanism through a single stroke and means for thereafter repositioning said feed mechanism, a mechanism for inserting transversals in aligned slots of a rank, power means energizable to move said inserting mechanism through a single stroke and means for thereafter repositioning the same, means operated on the conclusion of the power stroke of each of said mechanisms respectively to energize the power means of the other, and auxiliary means for preventing such energization of either mechanism until the completion of the repositioning movement thereof.

10. Apparatus for assembling slotted partition strips comprising a reciprocating member having pawls for advancing step by step ranks of longitudinals in unbroken succession by cooperation of the pawls with the slots thereof, a solenoid for operating the member in one direction and a return spring, a ram for driving transversals into aligned slots of a rank, a solenoid for operating the ram in one direction and a return spring, the circuit of each solenoid comprising a switch which is opened as the member actuated by the solenoid completes its stroke under the power of the solenoid, and a switch which is closed responsively to the completion of the power stroke of the other solenoid, a latch to hold open that switch in the circuit of the solenoid operating the reciprocating member which is normally closed on completion of the power stroke of the ram, and a tripper moving with the reciprocating member along a path which moves it against the latch on the return of the reciprocating member to its starting position to thereby release the latch.

11. A power operated machine for handling strips which includes a magazine for receiving a column of strips contacting side by side, means tending to advance the strips toward one end of the column, means to extract from the column a set of strips the positions of which therein are determinately spaced because of the presence between them of other strips of the column, the column thereafter closing up by movement of the remaining strips toward one end of the magazine, means controlling the supply of power to the machine and a feeler in that end of the magazine normally displaced by the pressure of the column and which, when released from such pressure moves to effect actuation of said controlling means to shut down the machine.

12. A machine for assembling slotted partition strips comprising a table over which a rank of longitudinals is advanced to an assembly point, a magazine for supporting a stack or column of longitudinals transversely and below the level of the same, a feeding device having pawls for cooperating with the slots of a rank of strips in spaced planes transversely of the table reciprocating opposite the magazine and table respectively, and means for raising at intervals strips in the magazine into the path of the former pawls.

13. A machine for assembling slotted partition strips comprising a table over which a rank of longitudinals is advanced to an assembly point, a magazine for supporting a stack or column of longitudinals transversely and below the level of the same, means whereby the elements of the stack are urged toward one base of the stack, means for advancing over the table a rank of longitudinals delivered from the magazine onto the table to be supported by the latter, means for transferring from the column a rank of longitudinals to the surface of the table to be supported thereby, and intermittently acting means to raise the elements of such rank into the path of said transferring means, the column closing up beneath said transferring means when said raising means retreats and the rank is withdrawn onto the table.

14. A machine for handling strips which includes a magazine for receiving a stack or column of strips contacting side by side, two sets of devices which move in planes spaced along the altitude of the column, the two sets moving in relatively transverse directions, each transverse to said altitude, one serving to move a rank of strips into the path of the other which withdraws them from the column.

15. A machine for assembling slotted partition strips comprising a table over which a rank of longitudinals is advanced to an assembly point, a magazine for supporting a stack or column of longitudinals transversely and below the level of the same, a feeding device having pawls for co-operating with the slots of a rank of strips in spaced planes transversely of the table reciprocating opposite the magazine and table respectively, and means for raising at intervals strips in the magazine into the path of the former pawls comprising pushers underlying the magazine and in planes corresponding to the desired spacing of the rank, cams for operating the pushers to raise a rank of strips from between their companions in the stack, and means for actuating said cams in timed relation to the feeding device.

16. A machine for assembling slotted partition strips comprising a table over which a rank of longitudinals is advanced to an assembly point, a magazine for supporting a stack or column of longitudinals transversely and below the level of the same, pushers underlying the magazine and in planes corresponding to the desired spacing of the rank, cams for operating the pushers to raise a rank of strips from between their companions in the stack to bring their lower edges to the level of the table, a feeding mechanism to engage the upper portions of the strips so raised to transfer them from their positions in the stack to the surface of the table, and means for driving the cams and feeding mechanism in timed relation.

DANIEL R. VAIL.
ROBERT A. DE LUCA.

REFERENCES CITED

The following references are of record in the file of this patent:

UNITED STATES PATENTS

| Number | Name | Date |
|---|---|---|
| 2,237,099 | Gillian et al. | Apr. 1, 1941 |
| 2,355,461 | Nichols | Aug. 8, 1944 |